Aug. 2, 1960 — J. U. LEHN — 2,947,107
ANIMAL TRAPS
Filed Sept. 18, 1958

United States Patent Office 2,947,107
Patented Aug. 2, 1960

2,947,107

ANIMAL TRAPS

John U. Lehn, Lititz, Pa., assignor to Animal Trap Company of America, Lititz, Pa., a corporation of Pennsylvania Filed Sept. 18, 1958, Ser. No. 761,747

5 Claims. (Cl. 43—92)

The present invention relates to improvements in traps and particularly traps for catching animals. In trapping fur-bearing and other animals, a trapper usually has a "line" which may consist of several dozen traps. As the traps are frequently set in places that are accessible only by foot, a trapper must frequently carry quite a number of traps with him at a time. It is therefore desirable for the traps to be as light and compact as possible to ease the burden of carrying them. It is also important for the traps to be of simple and inexpensive construction so that a trapper can afford to own a large number of traps. It is an object of the present invention to provide improved traps having these desirable characteristics.

A further advantage of traps in accordance with the invention is that they will operate satisfactorily even under adverse conditions. Moreover, they can be set to release under different tripping pressures so that the sensitivity of the traps can be varied to suit the particular game for which they are being used and the position and environment of the traps.

Other objects and advantages of the invention will appear from the following description and claims and from the accompanying drawings which illustrate by way of example a preferred embodiment of the invention and in which:

Figure 1:
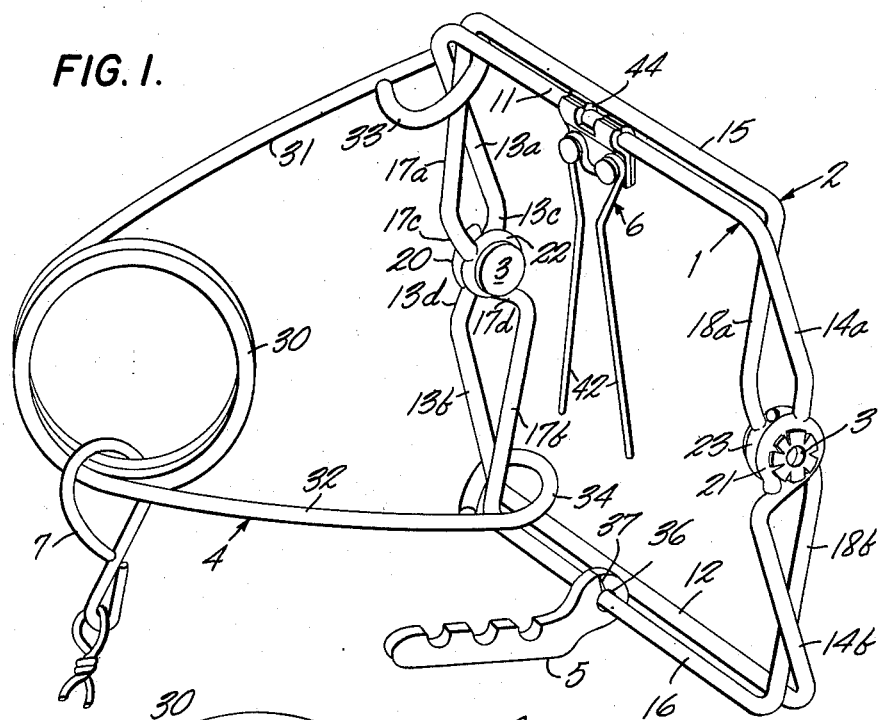
Fig. 1 is a perspective view of a trap in accordance with the invention in sprung or released position.

The trap shown by way of example in the drawings comprises two jaws 1 and 2 pivotally connected with one another by pivots 3, a spring 4 for actuating the jaws, a latch 5 for holding the jaws in set position and a trigger 6 for releasing the jaws. An anchor chain 7 is shown attached to the spring 4.

The jaws 1 and 2 are similar to one another and are in the form of hollow frames, each having opposite side portions and connecting end portions. Thus, the jaw 1 is shown as comprising side portions 11 and 12 and end portions 13 and 14. The other jaw 2 is shown as having side portions 15 and 16 and end portions 17 and 18. The jaws are conveniently made of strip or wire stock bent to provide the desired shape. For convenience and economy of manufacture, each of the jaws is shown as being made up of two halves which are brazed or welded together. Thus, the jaw 1 is shown as having one half comprising the side portion 11, an end portion 13a and an opposite end portion 14a and a second half comprising the side portion 12, an end portion 13b and an opposite end portion 14b. The end portion 13a of the first half is formed to provide a loop portion or eye 20 while the end portion 14b of the second half is similarly formed to provide a loop or eye 21. The end portion 13b of the second half is welded to the periphery of the eye 20 while the end portion 14a of the first half is welded to the eye 21, thereby joining the two halves together into an integral frame. As will be clearly seen in Fig. 1, the end portions 13a and 13b of the jaw 1 are bent at obtuse angles so as to provide short portions 13c, 13d which project approximately radially from the eye 20 in approximately diametrical alignment with one another while the remaining portions 13a and 13b are approximately equal to the diameter of the eye 20. The opposite end portions 14a and 14b of the jaw 1 are similarly formed.

The other jaw 2 is similar to jaw 1 and of approximately the same width but is slightly shorter so that the end portions 17 and 18 of jaw 2 fit snugly inside the end portions 13 and 14 of jaw 1. Jaw 2 is similarly formed of two halves of which one comprises the side portion 15 and opposite end portions 17a and 18a while the other comprises the side portion 16 and opposite end portions 17b and 18b. Opposite end portions of jaw 2 are provided with eyes 22 and 23 which fit axially inside and in alignment with the eyes 20 and 21 of jaw 1. The eyes are located approximately midway between the opposite sides of the respective jaws. The end portions 17a and 17b have angular portions 17c and 17d adjacent the eye 22. The opposite end portions 18a and 18b are similarly formed, the jaw being reversible.

The pivotal connections 3 between the jaws 1 and 2 are shown as comprising a pivot pin or shaft extending through aligned eyes 20 and 22 of the jaws and a second pivot pin or shaft extending through aligned eyes 21 and 23. For convenience and economy of manufacture, the pivot pins 3 are shown as comprising hollow rivets, each having a head portion 25 at one end and a flanged portion 26 at the opposite end formed by a suitable pivoting operation after the rivet is inserted through the aligned eyes. With the pivotal connections provided by the pivots 3, the jaws 1 and 2 are swingable between the sprung or released position shown in Fig. 1, in which the side portion 11 of the jaw 1 is adjacent the side portion 15 of jaw 2, and the set position shown in Fig. 2, in which the side portion 11 of jaw 1 is adjacent the side portion 16 of jaw 2.

The spring 4 is shown as comprising a spiral portion 30 consisting of one or more loops and end portions providing arms 31 and 32. An eye or loop 33 formed at the end of the spring arm 31 encircles end portions 13a and 17a of the jaws 1 and 2 while an eye or loop 34 formed at the end of the spring arm 32 encircles end portions 13b and 17b of the jaws. When the jaws are swung from the released position shown in Fig. 1 to the set position shown in Fig. 2, the loop portions 33 and 34 are forced inwardly toward the pivot 3 so as to encircle the end portions 13c, 17c and 13d and 17d adjacent the pivot eyes 20 and 22 of the jaws.

Figures 2, 3:
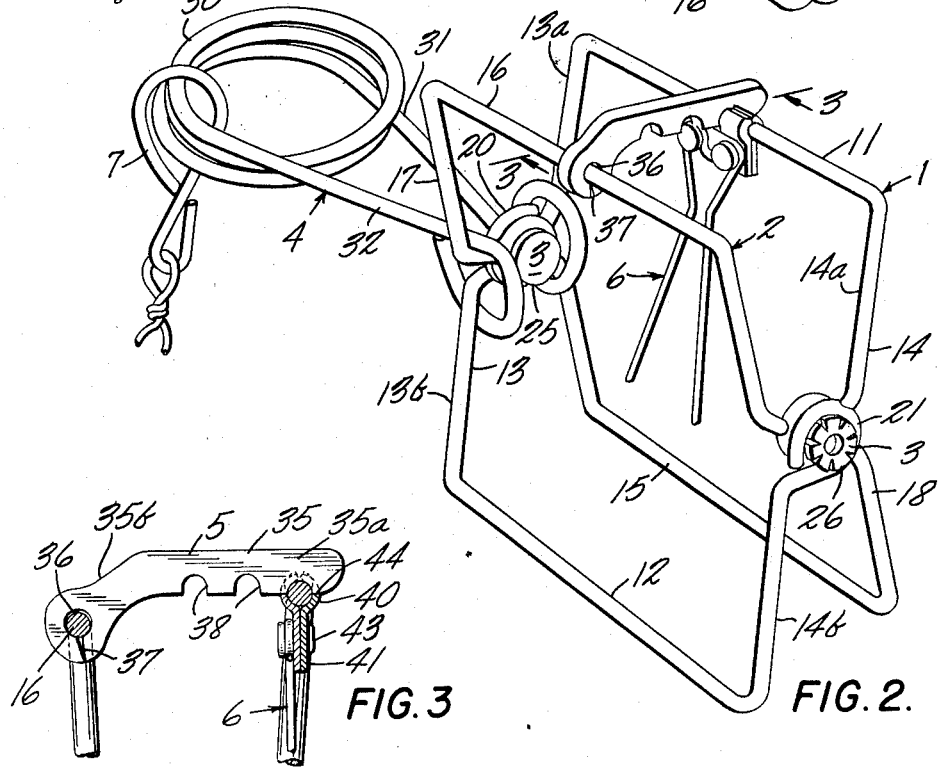
Fig. 2 is a perspective view of the trap in set position.
Fig. 3 is a fragmentary sectional view taken approximately on the line 3—3 in Fig. 2 and illustrating improved latch and trigger mechanism of the trap.

The inherent resiliency of the spring tends to swing the spring arms 31 and 32 apart, thereby forcibly pivoting the jaws 1 and 2 from the position shown in Fig. 2 toward that shown in Fig. 1. Although the force exerted by the spring is at a maximum when the trap is in set position (Fig. 2), the jaws can readily be held in this position since the spring acts on the jaws near the pivot and hence with a short lever arm. As the loops 33 and 34 move outwardly on the end portions of the jaws, the effective lever arm is increased and moreover there is wedging action by reason of the angular relation of the end portions of the jaws so that the jaws are urged forcibly toward one another and securely hold an animal caught between them. A similar spring may be provided if desired at the opposite ends of the jaws.

The jaws are releasably held in set position by means of the catch or latch 5 which is shown as comprising a small latch member pivotally mounted on the side portion 16 of jaw 2. In the preferred form shown in the drawings, the latch member comprises a bar 35 having a substantially straight portion 35a and an inner end portion 35b disposed at an obtuse angle to the portion 35a and provided with a hole or opening 36 that receives the side portion of the jaw. For economy of manufacture, a cut or slot 37 opens into the hole 36 so that portions of the member on opposite sides of the slot 37 can be spread apart to slip on over the jaw and then pressed back together to retain the latch in place. When assembled on the jaw, the latch is rotatable about the side portion of the jaw as a pivot and is also slidable longitudinally of the jaw. On its inner edge, i.e. the edge facing inwardly toward the pivotal axis of the trap when in set position (Fig. 2), the latch bar 35 is provided with one or more notches 38 of a size to fit over the side portion of the opposite jaw. When the jaws are formed of round wire, the depth of the notches 38 should be slightly greater than the radius of the wire so that the latch will not slip off the jaw 1 when the trap is in set position. When several notches are provided, they may, if desired be of different depths.

The trigger 6 is rotatable on the jaw engaged by the latch 5 and is adapted, when actuated in either direction to push the latch off so as to disengage it from the jaw. As shown in the drawings, the trigger comprises a sleeve portion 40 which fits around the side portion 11 of the jaw 1 and a flat portion 41 projecting radially from the sleeve portion. A two-pronged trigger arm 42 is secured to the flat portion 41 and when the trap is in set position projects inwardly so as to lie approximately in a plane between the jaws. For convenience of manufacture and assembly, the sleeve portion 40 and flat portion 41 are formed of two small stamped plates riveted together and the trigger arm 41 comprises a bent wire which is secured to the flat portion 41 by the same rivets 43. In the sleeve portion 40 there is provided a notch or recess 44 which is located opposite the flat position 41 and has a depth slightly greater than the radius of the sleeve. The recess 44 is adapted to receive the latch member 5 so as to allow the latch member to engage a portion of the jaw 1 exposed by the recess, as illustrated in Figs. 2 and 3. When the trigger is swung in either direction from the position shown in Fig. 2, one or the other of the bottom edges of the recess 44 engages the latch 5 and pushes it slightly outwardly so as to disengage the latch from the jaw. By providing the latch member 5 with several notches located at different distances from the jaw 2 on which the latch is pivotally mounted, the amount the jaws are open and hence the spring pressure acting on the jaws can be varied as desired. This in turn varies the force required to disengage the latch from the opposite jaw and hence provides selectivity in the sensitivity and speed of action of the trap.

In the drawings, the jaws are shown as being approximately square in shape with straight side portions and with a length approximately equal to the width of the jaws. The dimensions of the spring are such that it will swing into a flat position between the opposite sides of the jaws when in sprung position. However, the size and shape of the jaws can be varied, depending on the purpose for which the trap is intended. As will be understood by those skilled in the art, still other variations and modifications may be made within the scope of the invention as defined by the appended claims.

What I claim and desire to secure by Letters Patent is:

1. A trap comprising two similar frames, each having opposite side portions and connecting end portions, pivot means pivotally connecting the end portions of said frames together intermediate said side portions, spring means for swinging said frames relative to one another about their pivots from a set position in which a first side portion of one frame is adjacent a first side portion of the other frame to a closed position in which said first side portion of each frame is adjacent a second side portion of the other frame, a latch member pivotally carried on one of said frames and comprising an arm having a plurality of notches spaced along said arm and adapted to receive said other frame in a selected one of said notches to hold said frames in set position, and a trigger member pivotally carried on the other frame and having a portion engaging said latch to release said other frame from said selected notch and thereby release said frames.

2. A trap comprising two similar frames, each having opposite side portions and connecting end portions, pivot means pivotally connecting the end portions of said frames together intermediate said side portions, spring means for swinging said frames relative to one another about their pivots from a set position in which a first side portion of one frame is adjacent a first side portion of the other frame to a closed position in which said first side portion of each frame is adjacent a second side portion of the other frame, a latch member pivotally carried on one of said frames and having a detent portion engaging said other frame to hold said frames in set position and trigger means comprising a sleeve portion rotatable on a portion of said other frame and having an opening in said sleeve to receive said detent portion of the latch and an arm projecting from said sleeve, said arm providing means for rotating said sleeve to disengage said latch member.

3. An animal tray comprising two similar frames, each formed of wire stock bent to provide opposite side portions constituting jaws of the trap and opposite end portions joining together the side portions, pivot means joining together the end portions of the two frames at their midpoints for rotation of said frames about a common axis from an open position of the trap in which a first side portion of one frame is closely adjacent and parallel to the second side portion of the other frame, spring means for rotating said frames relative to one another from said open to said closed position, latch means comprising a tension member rotatable on said first side portion of one frame and having a detent portion releasably engaging said first side portion of the other frame to hold said first side portions against movement away from one another and thereby hold said trap in set position and trigger means comprising a trip member rotatable on the first side portion of said other frame and having a portion engaging said tension member to disengage said detent from said first side portion of said other frame and thereby release said frames for movement by said spring means to closed position.

4. A trap according to claim 3, in which said tension member and trip member are slidable along said first side portions of said frames to different selected positions.

5. An animal trap comprising two similar frames, each having opposite side portions constituting jaws of the trap and opposite end portions joining the side portions, each of said frames comprising two lengths of wire stock having one end of the end portions bent back on themselves to form eyes and the other end of the end portions being welded to said eyes to join said lengths together, said eyes being disposed at approximately the middles of the end portions of said frames and in a plane perpendicular to the general plane of said frame, the eyes of one frame being adjacent and registering with the corresponding eyes of the other frame, pivot pins extending through said registered eyes to connect said frames pivotally with one another for relative rotation from an open position of the trap in which a first side portion of one frame is adjacent a first side portion of the other frame to a closed position in which said first side portion of one frame is adjacent the second side portion of said other frame, spring means for rotating said frames relative to one another from said open to said closed position, latch means rotatable on one of said frames and releasably engaging the other of said frames to hold said frames in open position against the action of said spring means and trigger means for disengaging said latch means to release said frames for movement by said spring means to closed position.

References Cited in the file of this patent

UNITED STATES PATENTS

| | | |
|---|---|---|
| 1,210,253 | Ahlenius | Dec. 26, 1916 |
| 2,228,808 | Keppel | Jan. 14, 1941 |
| 2,701,428 | Mau | Feb. 8, 1955 |